(12) United States Patent
Tsuchida et al.

(10) Patent No.: US 9,982,773 B2
(45) Date of Patent: May 29, 2018

(54) POWER TRANSMISSION DEVICE

(71) Applicant: AISIN AW CO., LTD., Anjo-shi, Aichi-ken (JP)

(72) Inventors: Kenichi Tsuchida, Nishio (JP); Yoshimitsu Hyodo, Nishio (JP); Yuhei Yoshioka, Anjo (JP); Nobuhiko Miyamoto, Nukata (JP); Mitsuhiro Hasama, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 233 days.

(21) Appl. No.: 15/034,038

(22) PCT Filed: Nov. 27, 2014

(86) PCT No.: PCT/JP2014/081396
§ 371 (c)(1),
(2) Date: May 3, 2016

(87) PCT Pub. No.: WO2015/080205
PCT Pub. Date: Jun. 4, 2015

(65) Prior Publication Data
US 2016/0290496 A1 Oct. 6, 2016

(30) Foreign Application Priority Data
Nov. 29, 2013 (JP) .................. 2013-248652

(51) Int. Cl.
*F15B 21/04* (2006.01)
*F16H 61/00* (2006.01)
(Continued)

(52) U.S. Cl.
CPC ....... *F16H 61/0031* (2013.01); *F15B 21/041* (2013.01); *F16H 57/0435* (2013.01);
(Continued)

(58) Field of Classification Search
CPC ............... F15B 21/041; F16H 61/0031; F16H 57/0435; F16H 57/0446
See application file for complete search history.

(56) References Cited

U.S. PATENT DOCUMENTS 8,303,468 B2    11/2012  Shimizu et al.
8,467,947 B2 *   6/2013  Zollner ................. B60W 10/30
                                                180/65.265
(Continued)

FOREIGN PATENT DOCUMENTS

JP    2003-240104 A    8/2003
JP    2005-291461 A   10/2005
(Continued)

*Primary Examiner* — Thomas E Lazo
(74) *Attorney, Agent, or Firm* — Oliff PLC

(57) ABSTRACT

A power transmission device that includes a transmission including a plurality of engagement elements for transmitting power from a motor to axles; a case to accommodate the transmission; a hydraulic control device to control hydraulic pressure to the engagement elements; a hydraulic oil reservoir that stores hydraulic oil; and a first pump that is operated by the power from the motor and that suctions the hydraulic oil from the hydraulic oil reservoir through a strainer and supplies the hydraulic oil to the hydraulic control device.

20 Claims, 9 Drawing Sheets

(51) Int. Cl.
*F16H 57/04* (2010.01)
*F16H 61/02* (2006.01)
*F16H 3/66* (2006.01)

(52) U.S. Cl.
CPC ..... *F16H 57/0441* (2013.01); *F16H 57/0446* (2013.01); *F16H 61/0265* (2013.01); *F16H 3/66* (2013.01); *F16H 2061/0037* (2013.01); *F16H 2200/0052* (2013.01); *F16H 2200/201* (2013.01); *F16H 2200/2043* (2013.01); *F16H 2200/2046* (2013.01); *F16H 2200/2066* (2013.01); *F16H 2200/2082* (2013.01); *F16H 2312/14* (2013.01)

(56) References Cited

U.S. PATENT DOCUMENTS 8,784,249 B2 * 7/2014 Motodohi ............. F15B 21/001
 475/5
9,353,850 B2 * 5/2016 Pfleger ................ F16H 57/0435

FOREIGN PATENT DOCUMENTS

| JP | 2005-325879 A | 11/2005 |
| JP | 2010-164178 A | 7/2010 |

* cited by examiner

FIG. 3

|     | | C1 | C2 | B1 | B2 | B3 | F1 |
|---|---|---|---|---|---|---|---|
| P | | | | | | | |
| REV | | | | O | | O | |
| N | | | | | | | |
| D | 1sp | O | | | | (O) | O |
| | 2nd | O | | | O | | |
| | 3rd | O | | O | | | |
| | 4th | O | O | | | | |
| | 5th | | O | O | | | |
| | 6th | | O | | O | | |

*(O): ENGAGED WHEN ENGINE BRAKE IS IN OPERATION

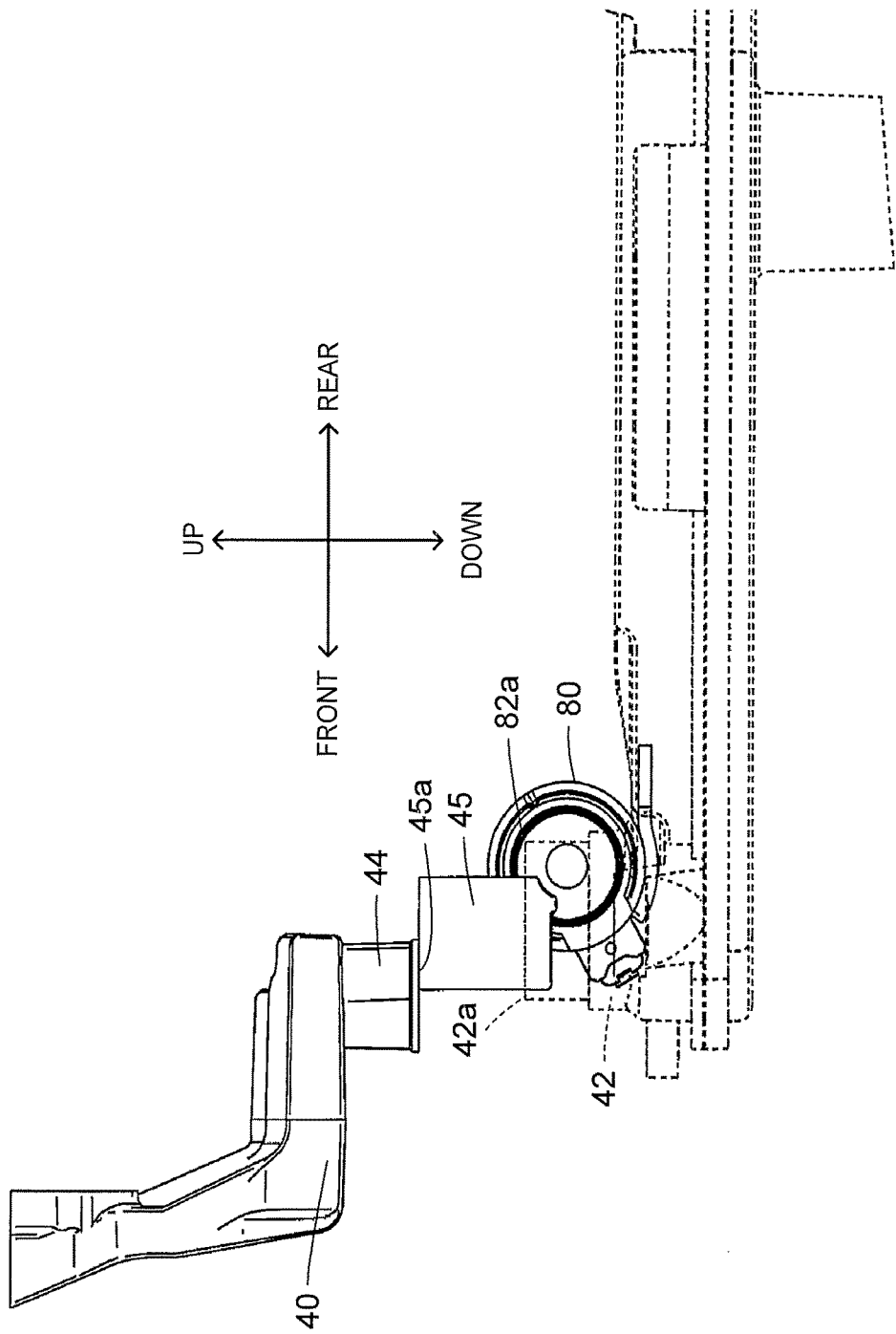

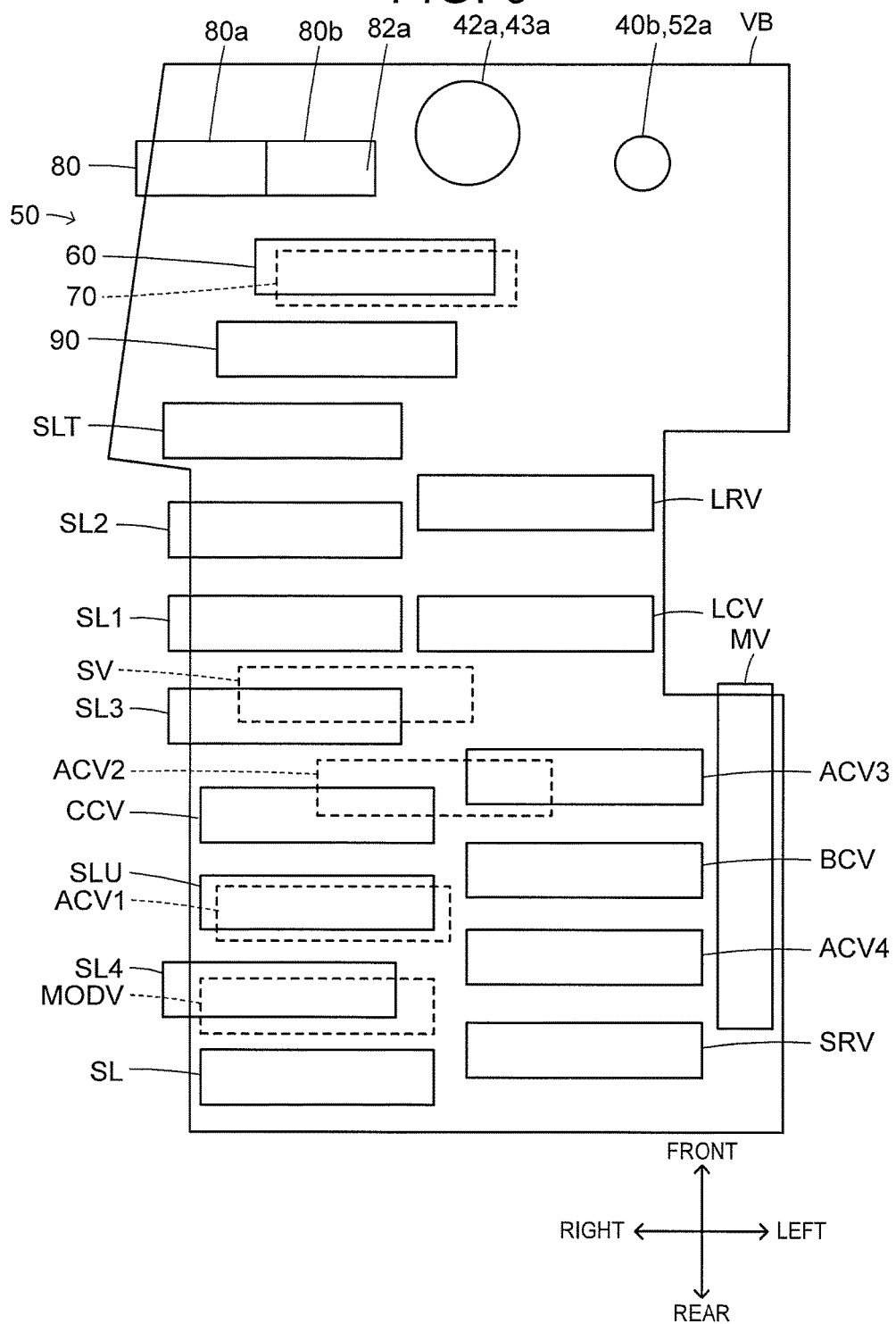

POWER TRANSMISSION DEVICE

BACKGROUND

The present disclosure relates to a power transmission device, and more in detail, to a power transmission device that is mounted on a vehicle and that includes a transmission including a plurality of engagement elements for transmitting power from a motor to axles, a case for accommodating the transmission, and a hydraulic control device for controlling hydraulic pressure to the engagement elements.

Power transmission devices of such a type have heretofore been proposed, each of which is mounted on a vehicle and includes an automatic transmission including a plurality of clutches, a hydraulic circuit serving as an actuator for driving the clutches, a mechanical oil pump that is driven by power from an engine to suction hydraulic oil from an oil pan via a strainer and supply the hydraulic oil to the hydraulic circuit, and an electromagnetic pump that is driven by an electromagnetic force to be capable of suctioning the hydraulic oil from an oil passage between the strainer and the mechanical oil pump and supplying the hydraulic oil to a clutch for starting the vehicle (refer to Japanese Patent Application Publication No. 2010-164178, for example). In this device, while the engine is automatically stopped, a hydraulic pressure is applied to the clutch for starting the vehicle from the electromagnetic pump instead of a linear solenoid valve of the hydraulic circuit, so that the linear solenoid valve can quickly engage the clutch immediately after the engine is automatically started next time, thereby starting the vehicle smoothly.

In such a power transmission device, in some cases depending on the way of arranging the electromagnetic pump, a communication oil passage for communicating the oil passage between the strainer and the mechanical oil pump with a suction port of the electromagnetic pump increases in length. The increase in length of the communication oil passage increases the suction resistance of the electromagnetic pump, causing difficulty in applying sufficient hydraulic pressure to the clutch for starting the vehicle from the electromagnetic pump.

The present disclosure according to an exemplary aspect provides a power transmission device that is capable of applying sufficient hydraulic pressure from a pump operated by receiving supply of electric power to an engagement element for starting the vehicle.

A first power transmission device according to an exemplary aspect of the present disclosure is a power transmission device that is mounted on a vehicle, the power transmission device includes a transmission including a plurality of engagement elements for transmitting power from a motor to axles; a case to accommodate the transmission; a hydraulic control device to control hydraulic pressure to the engagement elements; a hydraulic oil reservoir that stores hydraulic oil; and a first pump that is operated by the power from the motor and that suctions the hydraulic oil from the hydraulic oil reservoir through a strainer and supplies the hydraulic oil to the hydraulic control device, wherein the hydraulic control device includes: a second pump that is operated by receiving supply of electric power and that suctions the hydraulic oil and supplies the hydraulic oil to a starting engagement element among the engagement elements that is engaged to start the vehicle; a discharge port that discharges the hydraulic oil from the first pump; a mounting port for the strainer that communicates with the first pump and to which the strainer is mounted; a first oil passage that communicates the mounting port for the strainer with the first pump; and a second oil passage that communicates the first oil passage with the second pump, and also in that an input/output port group composed of a suction port of the second pump, the mounting port for the strainer, and the discharge port, which are arranged side by side in this order.

In the first power transmission device of the present disclosure, the hydraulic control device includes: the second pump that is operated by receiving the supply of the electric power and that suctions the hydraulic oil and supplies the hydraulic oil to the starting engagement element among the engagement elements that is engaged to start the vehicle; the discharge port that discharges the hydraulic oil from the first pump; the mounting port for the strainer that communicates with the first pump and to which the strainer is mounted; the first oil passage that communicates the mounting port for the strainer with the first pump; and the second oil passage that communicates the first oil passage with the second pump. The input/output port group composed of the suction port of the second pump, the mounting port for the strainer, and the discharge port, which are arranged side by side in this order. This structure allows the second oil passage to be shorter and thus the oil passage resistance (suction resistance of the second pump) to be lower. As a result, sufficient hydraulic pressure can be more easily applied from the second pump to the starting engagement element.

A second power transmission device according to an exemplary aspect of the present disclosure is a power transmission device that is mounted on a vehicle, the power transmission device includes a transmission including a plurality of engagement elements for transmitting power from a motor to axles; a case to accommodate the transmission; a hydraulic control device to control hydraulic pressure to the engagement elements; a hydraulic oil reservoir that stores hydraulic oil; and a first pump that is operated by the power from the motor and that suctions the hydraulic oil from the hydraulic oil reservoir through a strainer and supplies the hydraulic oil to the hydraulic control device, wherein the hydraulic control device includes: a second pump that is operated by receiving supply of electric power and that suctions the hydraulic oil and supplies the hydraulic oil to a starting engagement element among the engagement elements that is engaged to start the vehicle; a discharge port that discharges the hydraulic oil from the first pump; a mounting port for the strainer that communicates with the first pump and to which the strainer is mounted; a first oil passage that communicates the mounting port for the strainer with the first pump; a second oil passage that communicates the first oil passage with the second pump; and a plurality of control valves that control the hydraulic pressure, and also in that: a suction port of the second pump and the mounting port for the strainer are arranged side by side in this order in a direction orthogonal to a direction of mounting the hydraulic control device to a case member of the transmission, and also orthogonal to an axial direction of the transmission; and the suction port of the second pump and the mounting port for the strainer are arranged on a side closer to an internal combustion engine than the control valves are in the axial direction of the transmission.

In the second power transmission device of the present disclosure, the hydraulic control device includes: the second pump that is operated by receiving the supply of the electric power and that suctions the hydraulic oil and supplies the hydraulic oil to the starting engagement element among the engagement elements that is engaged to start the vehicle; the discharge port that discharges the hydraulic oil from the first pump; the mounting port for the strainer that communicates with the first pump and to which the strainer is mounted; the first oil passage that communicates the mounting port for the strainer with the first pump; the second oil passage that communicates the first oil passage with the second pump; and the control valves that control the hydraulic pressure. The suction port of the second pump and the mounting port for the strainer are arranged side by side in this order in the direction orthogonal to the direction of mounting the hydraulic control device to the case member of the transmission, and also orthogonal to the axial direction of the transmission. The suction port of the second pump and the mounting port for the strainer are arranged on a side closer to the internal combustion engine than the control valves are in the axial direction of the transmission. This structure allows the second oil passage to be shorter and thus the oil passage resistance (suction resistance of the second pump) to be lower. As a result, sufficient hydraulic pressure can be more easily applied from the second pump to the starting engagement element.

A third power transmission device according to an exemplary aspect of the present disclosure is a power transmission device that is mounted on a vehicle, the power transmission device includes a transmission including a plurality of engagement elements for transmitting power from a motor to axles; a case to accommodate the transmission; a hydraulic control device to control hydraulic pressure to the engagement elements; a hydraulic oil reservoir that stores hydraulic oil; a first pump that is operated by the power from the motor and that suctions the hydraulic oil from the hydraulic oil reservoir through a strainer and supplies the hydraulic oil to the hydraulic control device; a second pump that is operated by receiving supply of electric power and that suctions the hydraulic oil and supplies the hydraulic oil to a starting engagement element among the engagement elements that is engaged to start the vehicle; a first oil passage that communicates an outlet port of the strainer with the first pump; and a second oil passage that communicates the first oil passage with the second pump, wherein the second pump includes an electromagnetic unit and a pump unit, and is mounted on a valve body of the hydraulic control device such that the pump unit is placed between the electromagnetic unit and the outlet port of the strainer.

The third power transmission device of the present disclosure includes the first oil passage that communicates the outlet port of the strainer with the first pump and the second oil passage that communicates the first oil passage with the second pump. The second pump includes the electromagnetic unit and the pump unit, and is mounted on the valve body of the hydraulic control device such that the pump unit is placed between the electromagnetic unit and the outlet port of the strainer. This structure allows the second oil passage to be shorter and thus the oil passage resistance (suction resistance of the second pump) to be lower than in the case of mounting the second pump on the valve body such that the pump unit is placed farther from the outlet port of the strainer than the electromagnetic unit is. As a result, sufficient hydraulic pressure can be more easily applied from the second pump to the starting engagement element.

BRIEF DESCRIPTION OF THE DRAWINGS

FIG. 3 is an explanatory diagram showing an operation table representing relations of each shift speed of a transmission with operating states of clutches and brakes thereof.

FIG. 8 is a layout drawing showing the state of the vicinity of the strainer, the oil pump, and the electromagnetic pump, as viewed from the left side of the vehicle.

FIG. 9 is a layout drawing schematically showing a state (layout) of a valve body, valves (such as a primary regulator valve) of the hydraulic control device, and the electromagnetic pump, as viewed from the upper side of the vehicle.

DETAILED DESCRIPTION OF EMBODIMENTS

Modes for carrying out the present disclosure will be described below using an embodiment.

Figure 1:
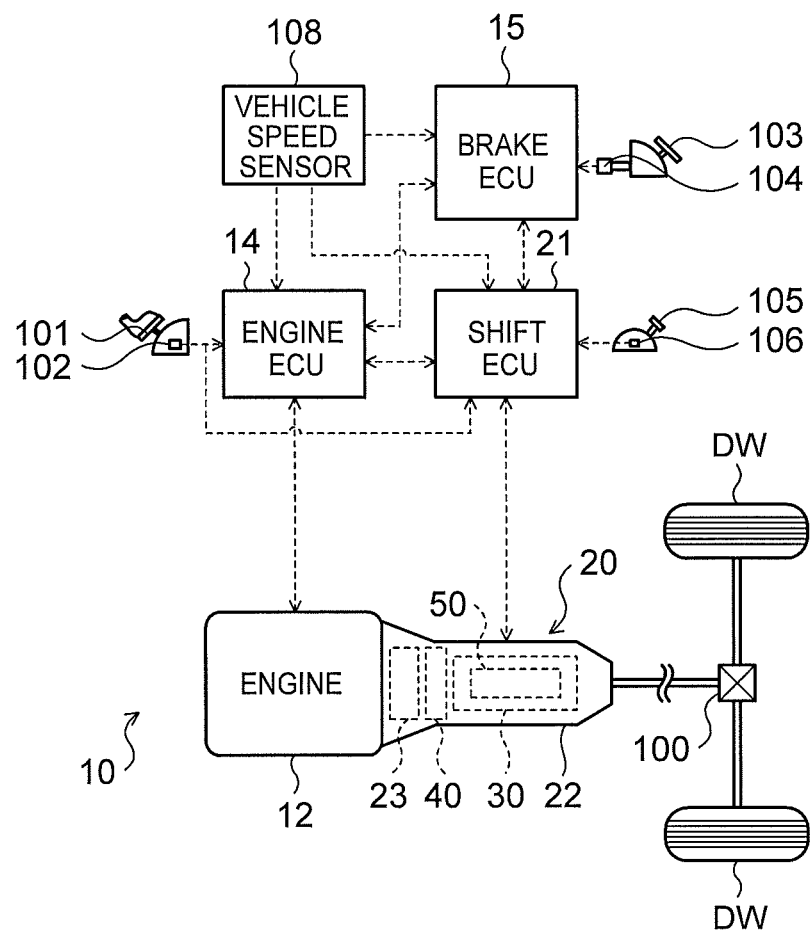
FIG. 1 is a structural diagram showing a schematic structure of an automobile equipped with a power transmission device as an embodiment of the present disclosure.
Figure 2:
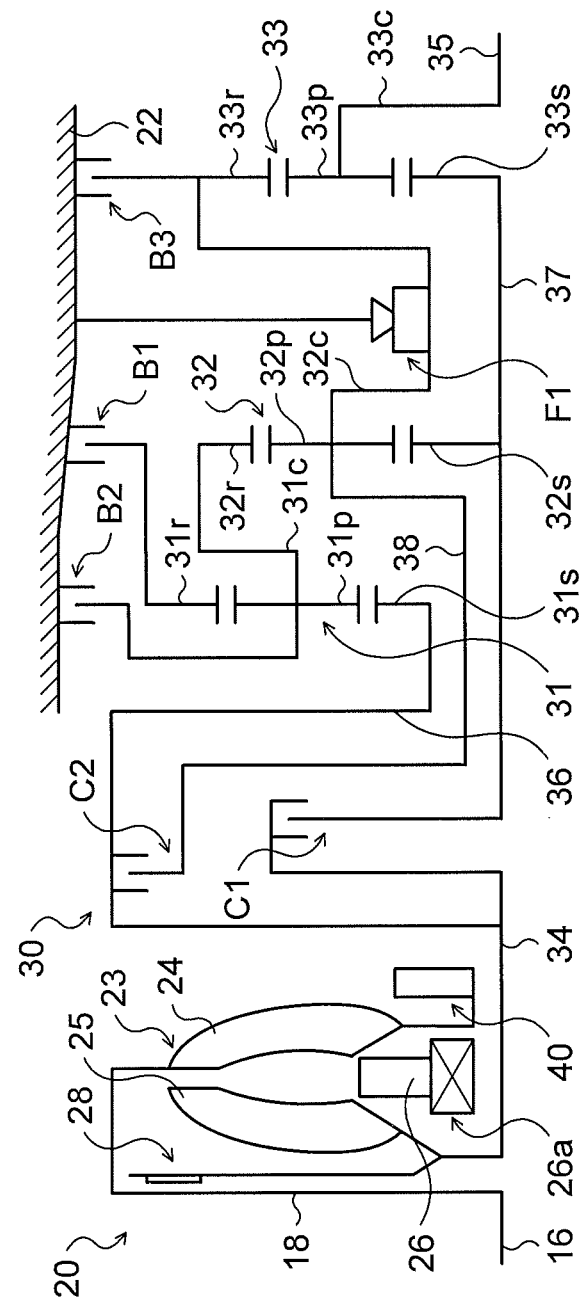
FIG. 2 is a structural diagram showing a schematic structure of the power transmission device.
Figure 4:
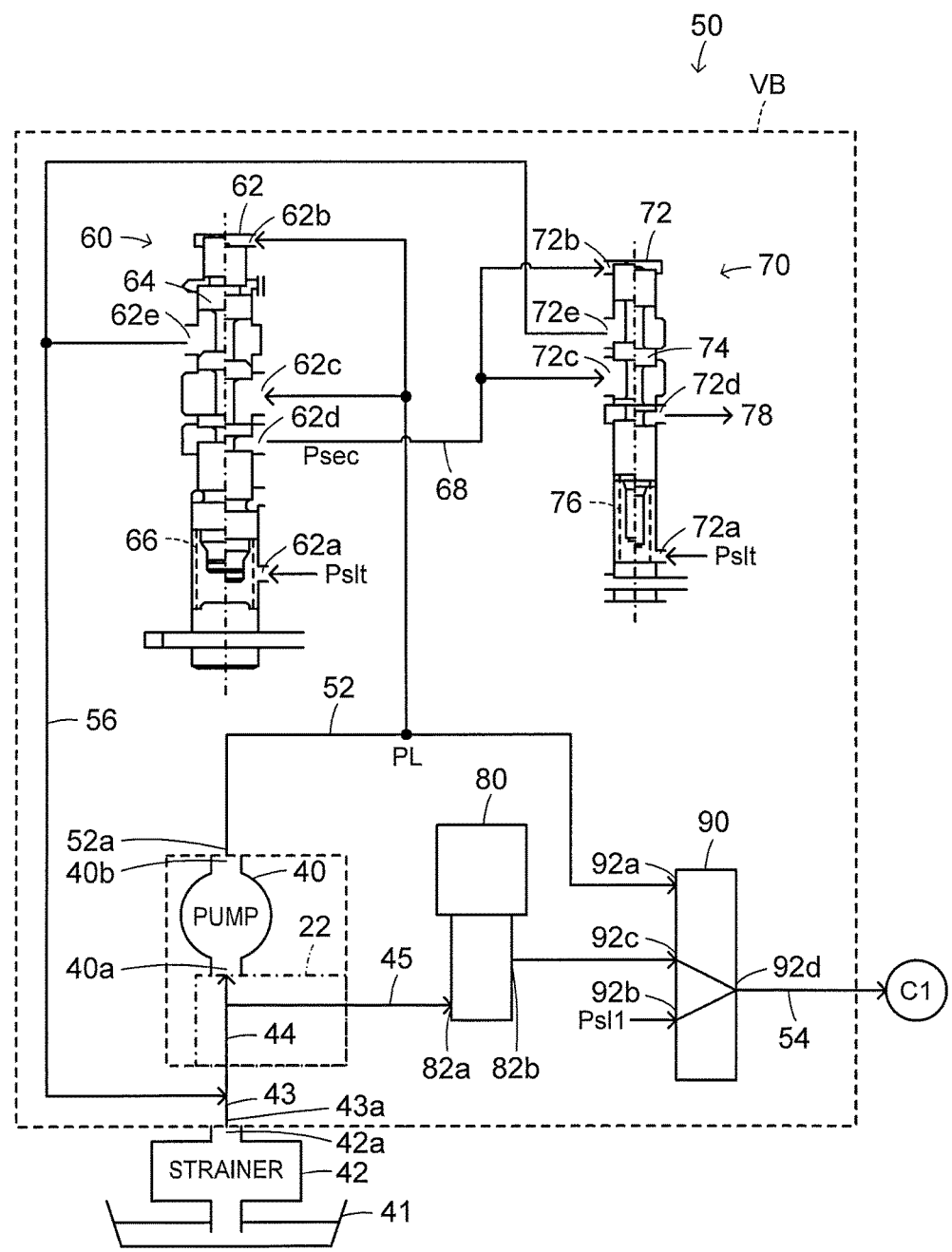
FIG. 4 is a structural diagram showing a schematic structure of the vicinity of a hydraulic oil reservoir, a strainer, an oil pump, and a hydraulic control device.

FIG. 1 is a structural diagram showing a schematic structure of an automobile 10 equipped with a power transmission device 20 as the embodiment of the present disclosure. FIG. 2 is a structural diagram showing a schematic structure of the power transmission device 20. FIG. 3 is an explanatory diagram showing an operation table representing relations of each shift speed of a transmission 30 with operating states of clutches C1 and C2 and brakes B1 to B3 thereof. FIG. 4 is a structural diagram showing a schematic structure of the vicinity of a hydraulic oil reservoir 41, a strainer 42, an oil pump 40, and a hydraulic control device 50.

The automobile 10 of the embodiment is structured as a rear-wheel-drive vehicle, and includes: an engine 12 serving as a motor; an engine electronic control unit (hereinafter, referred to as an engine ECU) 14 for controlling the engine 12; a brake electronic control unit (hereinafter, referred to as a brake ECU) 15 for controlling an electronically controlled hydraulic brake unit (not shown); and the power transmission device 20 for transmitting power from the engine 12 to driving wheels (rear wheels) DW via a differential gear 100, as shown in FIG. 1.

The power transmission device 20 includes, for example, the following: a fluid transmission device 23; the stepped transmission 30; the oil pump 40 serving as a hydraulic pressure generation source for the fluid transmission device 23 and the transmission 30; the hydraulic control device 50 for supplying and discharging hydraulic oil to and from the fluid transmission device 23 and the transmission 30; a transmission case 22 for accommodating these components; and a shift electronic control unit (hereinafter, referred to as a shift ECU) 21 for controlling the entire device.

The engine ECU 14 receives input information, such as an accelerator operation amount from an accelerator pedal position sensor 102 for detecting a depression amount of an accelerator pedal 101 and a vehicle speed from a vehicle speed sensor 108 for detecting the vehicle speed. The brake ECU 15 receives input information, such as a brake switch signal from a brake switch 104 for detecting depression of a brake pedal 103 and the vehicle speed from the vehicle speed sensor 108. The shift ECU 21 receives input information, such as the accelerator operation amount from the accelerator pedal position sensor 102, a shift position SP from a shift position sensor 106 for detecting a position of a shift lever 105, and the vehicle speed from the vehicle speed sensor 108. The engine ECU 14, the brake ECU 15, and the shift ECU 21 are connected to one another via communication ports, and exchange various control signals and data with one another.

The fluid transmission device 23 is structured as a hydraulic torque converter, and includes, for example, the following: a pump impeller 24 that is connected to a crankshaft 16 of the engine 12 via a front cover 18; a turbine runner 25 that is connected to an input shaft 34 of the transmission 30 via a turbine hub; a stator 26 that is placed inside the pump impeller 24 and the turbine runner 25, and regulates flow of hydraulic oil (ATF) from the turbine runner 25 to the pump impeller 24; a one-way clutch 26a for limiting the direction of rotation of the stator 26 to one direction; a damper mechanism (not shown); and a lock-up clutch 28, as shown in FIG. 2. The fluid transmission device 23 may be structured as a fluid coupling not having the stator 26.

The transmission 30 is structured as a six-speed transmission, and includes: a first planetary gear mechanism 31, a second planetary gear mechanism 32, and a third planetary gear mechanism 33, each serving as a single-pinion planetary gear; the input shaft 34; an output shaft 35; and the two clutches C1 and C2, the three brakes B1, B2, and B3, and a one-way clutch F1 for changing a power transmission path from the input shaft 34 to the output shaft 35. The first, second, and third planetary gear mechanisms 31 to 33, the clutches C1 and C2, the brakes B1 to B3, and the one-way clutch F1 are accommodated inside the transmission case 22. The input shaft 34 of the transmission 30 is connected to the crankshaft of the engine via the fluid transmission device 23. The output shaft 35 is connected to the driving wheels via the differential mechanism (differential gear).

The first planetary gear mechanism 31 is placed closest to the engine (vehicle front), that is, closest to the input shaft 34 among the first, second, and third planetary gear mechanisms 31 to 33, and constitutes a speed change gear mechanism in conjunction with the next-nearest second planetary gear mechanism 32 at the subsequent stage. The first planetary gear mechanism 31 includes: a first sun gear $31s$ that is an external gear; a first ring gear $31r$ serving as a fixable element that is an internal gear arranged concentrically with the first sun gear $31s$; and a first carrier $31c$ rotatably and revolvably supporting a plurality of first pinion gears $31p$ that mesh with the first sun gear $31s$ and also mesh with the first ring gear $31r$. The first sun gear $31s$ of the first planetary gear mechanism 31 is fixed to an annular connection drum 36 that is connected (spline-fitted) to a clutch drum of the clutch C1 that is rotatable together with the input shaft 34.

The second planetary gear mechanism 32 is provided in parallel with the first planetary gear mechanism 31 on the output shaft 35 side (vehicle rear side) thereof. The second planetary gear mechanism 32 includes: a second sun gear $32s$ that is an external gear; a second ring gear $32r$ serving as a fixable element that is an internal gear arranged concentrically with the second sun gear $32s$; and a second carrier $32c$ rotatably and revolvably supporting a plurality of second pinion gears $32p$ that mesh with the second sun gear $32s$ and also mesh with the second ring gear $32r$. The second sun gear $32s$ of the second planetary gear mechanism 32 is fixed to a hollow intermediate shaft 37 that is placed between the input shaft 34 and the output shaft 35 so as to be rotatable about both of the input shaft 34 and the output shaft 35. The second ring gear $32r$ of the second planetary gear mechanism 32 is connected to the first carrier $31c$ of the first planetary gear mechanism 31. The second carrier $32c$ of the second planetary gear mechanism 32 is fixed to a sleeve 38 that is coaxially and rotatably supported by the intermediate shaft 37.

The third planetary gear mechanism 33 is placed closest to the output shaft 35 (vehicle rear) among the first, second, and third planetary gear mechanisms 31 to 33, and functions as a reduction gear mechanism. The third planetary gear mechanism 33 includes: a third sun gear $33s$ that is an external gear; a third ring gear $33r$ serving as a fixable element that is an internal gear arranged concentrically with the third sun gear $33s$; and a third carrier $33c$ rotatably and revolvably supporting a plurality of third pinion gears $33p$ that mesh with the third sun gear $33s$ and also mesh with the third ring gear $33r$. The third sun gear $33s$ of the third planetary gear mechanism 33 is fixed to the intermediate shaft 37 and connected to the second sun gear $32s$ of the second planetary gear mechanism 32. The third ring gear $33r$ of the third planetary gear mechanism 33 is connected to the second carrier $32c$ of the second planetary gear mechanism 32. The third carrier $33c$ of the third planetary gear mechanism 33 is connected to the output shaft 35.

The clutch C1 is a multi-plate hydraulic clutch that can connect and disconnect the input shaft 34 to and from the intermediate shaft 37, that is, the second sun gear $32s$ of the second planetary gear mechanism 32 and the third sun gear $33s$ of the third planetary gear mechanism 33. The clutch C2 is a multi-plate hydraulic clutch that can connect and disconnect the input shaft 34 to and from the sleeve 38, that is, the second carrier $32c$ of the second planetary gear mechanism 32. The one-way clutch F1 allows the second carrier $32c$ of the second planetary gear mechanism 32 and the third ring gear $33r$ of the third planetary gear mechanism 33 to rotate only in the normal direction while restraining them from rotating in the reverse rotation.

The brake B1 is a multi-plate hydraulic brake that can hold the first ring gear $31r$ of the first planetary gear mechanism 31 stationary to the transmission case 22, and can cancel the holding of the first ring gear $31r$ to the transmission case 22. The brake B2 is a multi-plate hydraulic brake that can hold the first carrier $31c$ of the first planetary gear mechanism 31 stationary to the transmission case 22 to hold the second ring gear $32r$ of the second planetary gear mechanism 32 stationary to the transmission case 22, and can cancel the holding of the first carrier $31c$ and the second ring gear $32r$ to the transmission case 22. The brake B3 is a multi-plate hydraulic brake that can hold the second carrier $32c$ of the second planetary gear mechanism 32 and the third ring gear $33r$ of the third planetary gear mechanism 33 stationary to the transmission case 22, and can cancel the holding of the second carrier $32c$ and the third ring gear $33r$ to the transmission case 22.

The clutches C1 and C2 and the brakes B1 to B3 operate in response to the supply and discharge of the hydraulic oil by the hydraulic control device. The transmission 30 brings the clutches C1 and C2 and the brakes B1 to B3 into the states shown in the operation table of FIG. 3 to provide shift speeds for first to sixth forward speeds and one reverse speed.

The oil pump 40 is structured as a gear pump, and includes a pump assembly constituted by a pump body and a pump cover, and also includes an external gear connected to the pump impeller 24 of the fluid transmission device 23 via a hub. The oil pump 40 is driven by the power from the engine 12, and, as shown in FIG. 4, the oil pump 40 suctions the hydraulic oil stored in the hydraulic oil reservoir 41 through the strainer 42, an oil passage 43 formed in the valve body VB of the hydraulic control device 50, an oil passage 44 formed in the transmission case 22, and a suction port 40a formed in the pump assembly, increases the pressure of the suctioned hydraulic oil, and supplies the hydraulic oil at the increased pressure to an oil passage 52 formed in the valve body VB of the hydraulic control device 50 through a discharge port 40b formed in the pump assembly. In addition to, for example, the oil passages 43 and 52, the following are formed in the valve body VB of the hydraulic control device 50: a mounting port 43a that communicates with the oil passage 43 and to which an outlet port 42a of the strainer 42 is mounted; and a connection port 52a that communicates with the oil passage 52 and is connected to the discharge port 40b of the oil pump 40.

The hydraulic control device 50 includes the following: a primary regulator valve (pressure regulator valve) 60 that regulates the pressure of the hydraulic oil supplied from the discharge port 40b of the oil pump 40 through the connection port 52a to the oil passage 52 to generate a line pressure PL, and discharges at least a portion of the hydraulic oil to an oil passage 68 along with the generation of the line pressure PL; a secondary regulator valve 70 that regulates the pressure of the hydraulic oil discharged from the primary regulator valve 60 to the oil passage 68 to generate a secondary pressure Psec, and discharges at least a portion of the hydraulic oil to a lubricating oil passage (LUBE) 78 along with the generation of the secondary pressure Psec; a modulator valve MODV that uses the line pressure PL as a source pressure to generate a constant modulator pressure Pmod; a linear solenoid valve SLT that uses the modulator pressure Pmod as a source pressure to generate a hydraulic pressure Pslt corresponding to the accelerator operation amount or a throttle opening amount, and outputs the generated hydraulic pressure Pslt as a signal pressure to the primary regulator valve 60 and the secondary regulator valve 70 to drive the primary and secondary regulator valves 60 and 70; a manual valve MV that has, for example, an input port for receiving the line pressure PL, a drive-position (D-position) output port, and a reverse-position (R-position) output port formed therein, and opens and closes the ports in conjunction with operations of the shift lever 105; a linear solenoid valve SL1 that receives hydraulic oil output from the D-position output port of the manual valve MV through an input port, then regulates the pressure of the received hydraulic oil while involving a discharge thereof from a drain port, and outputs the hydraulic oil regulated in pressure from an output port; the electromagnetic pump 80 that suctions the hydraulic oil from the above-described oil passage 44 formed in the transmission case 22 through an oil passage 45 formed in the valve body VB, and discharges the hydraulic oil after being increased in pressure; and a switching valve 90 (clutch C1 apply relay valve) that performs switching between a first state of supplying the hydraulic oil (at a hydraulic pressure Psl1) from the linear solenoid valve SL1 to an oil passage 54 for the clutch C1 and also supplying the hydraulic oil from the electromagnetic pump 80 to the lubricating oil passage 78 and a second state of cutting off the supply of the hydraulic oil from the linear solenoid valve SL1 to the oil passage 54 and supplying the hydraulic oil from the electromagnetic pump 80 to the oil passage 54 for the clutch C1. The hydraulic oil that has been supplied to the lubricating oil passage 78 is supplied to and lubricates mechanical parts, such as the gears of the first, second, and third planetary gear mechanisms 31 to 33, the clutches C1 and C2, the brakes B1 to B3, the differential gear 100, and bearings for rotatably supporting rotational shafts, and then, returns again to the hydraulic oil reservoir 41. FIG. 4 does not show the hydraulic system for the clutch C2 (except the clutch C1), the brakes B1 to B3, and the lock-up clutch 28 of the fluid transmission device 23 because the hydraulic system for these components does not constitute the core of the present disclosure. The hydraulic system for these components can be structured using known linear solenoid valves, such as linear solenoid valves SL2, SL3, and SL4, a brake B1 apply control valve ACV1, a brake B2 apply control valve ACV2, a brake B3 apply control valve ACV3, a brakes B1/B3 apply control valve ACV4, a brake B3 control valve BCV, a sequence valve SV, a clutch control valve CCV, a solenoid relay valve SRV, a solenoid relay switching valve SL, a lock-up solenoid valve SLU, a lock-up relay valve LRV, and a lock-up control valve LCV.

The primary regulator valve 60 includes the following: a sleeve 62 having various ports formed therein, including a signal pressure input port 62a that receives the hydraulic pressure Pslt as a signal pressure from the linear solenoid valve SLT, a feedback input port 62b that is connected to the oil passage 52 communicating with the discharge port 40b of the oil pump 40 through the connection port 52a and receives the line pressure PL as a feedback pressure, an input port 62c that is connected to the oil passage 52, an output port 62d that is connected to the oil passage 68 to the secondary regulator valve 70, and a drain port 62e that is connected to an oil passage 56 communicating with the oil passage 43 connected to the outlet port 42a of the strainer 42; a spool 64 that is slidable in the sleeve 62 in the axial direction thereof; and a spring 66 for urging the spool 64 upward in FIG. 4 in the axial direction thereof. The primary regulator valve 60 increases the amount of oil output from the input port 62c through the output port 62d to the oil passage 68 as the spool 64 moves downward in FIG. 4, and, when the spool 64 moves further downward, drains the hydraulic oil from the input port 62c through the drain port 62e to the oil passage 56 to reduce the hydraulic pressure from the oil pump 40 to regulate the line pressure PL. The spool 64 is urged upward in FIG. 4 by a spring force of the spring 66 and a hydraulic pressure applied to the signal pressure input port 62a, and is urged downward in FIG. 4 by the line pressure PL applied to the feedback input port 62b, so that the line pressure PL increases as the hydraulic pressure Pslt applied to the signal pressure input port 62a increases. The hydraulic oil drained from the drain port 62e to the oil passage 56 returns to the oil passage 43.

The secondary regulator valve 70 includes the following: a sleeve 72 having various ports formed therein, including a signal pressure input port 72a that receives the hydraulic pressure Pslt as a signal pressure from the linear solenoid valve SLT, a feedback input port 72b that is connected to the oil passage 68 from the primary regulator valve 60 and receives the secondary pressure Psec as a feedback pressure, an input port 72c that is connected to the oil passage 68, an output port 72d that is connected to the lubricating oil passage 78, and a drain port 72e that is connected to the oil passage 56 communicating with the oil passage 43; a spool 74 that is slidable in the sleeve 72 in the axial direction thereof; and a spring 76 for urging the spool 74 upward in FIG. 4 in the axial direction thereof. The secondary regulator valve 70 increases the amount of oil output from the input port 72c through the output port 72d to the lubricating oil passage 78 as the spool 74 moves downward in FIG. 4, and, when the spool 74 moves further downward, drains the hydraulic oil from the input port 72c through the drain port 72e to the oil passage 56 to reduce the hydraulic pressure from the primary regulator valve 60 to regulate the secondary pressure Psec. The spool 74 is urged upward in FIG. 4 by a spring force of the spring 76 and a hydraulic pressure applied to the signal pressure input port 72a, and is urged downward in FIG. 4 by the secondary pressure Psec applied to the feedback input port 72b, so that the secondary pressure Psec increases as the hydraulic pressure Pslt applied to the signal pressure input port 72a increases. The hydraulic oil drained from the drain port 62e to the oil passage 56 returns to the oil passage 43.

Although details are not shown in FIG. 4, the electromagnetic pump 80 includes an electromagnetic unit 80a for generating an electromagnetic force through energization of a coil and a pump unit 80b operated by the electromagnetic force of the electromagnetic unit 80a. The pump unit 80b includes the following: a hollow cylindrical-shaped cylinder in which a suction port 82a for suctioning the hydraulic oil from the oil passage 45 and a discharge port 82b for discharging the hydraulic oil are formed; a cylindrical-shaped piston that is slidable in the cylinder by receiving a pressing force caused by the electromagnetic force from the electromagnetic unit; a spring for urging the piston toward a direction opposite to the pressing direction of the electromagnetic force; a intake check valve built in the cylinder for allowing the hydraulic oil to flow in from the suction port 82a and prohibiting the hydraulic oil from flowing out toward the opposite direction thereof; and a discharge check valve built in the piston for allowing the hydraulic oil to flow out to the discharge port 82b and prohibiting the hydraulic oil from flowing in toward the opposite direction thereof. The electromagnetic pump 80 reciprocates the piston of the pump unit 80b through intermittent energization of the coil of the electromagnetic unit 80a to increase the pressure of the hydraulic oil suctioned through the suction port 82a and discharge the hydraulic oil at the increased pressure from the discharge port 82b.

Although details are not shown in FIG. 4, the switching valve 90 includes the following: a sleeve having various ports formed therein, including a signal pressure input port 92a that receives the line pressure PL as a signal pressure from the oil passage 52, a first input port 92b that is connected to the output port of the linear solenoid valve SL1, a second input port 92c that is connected to the discharge port 82b of the electromagnetic pump 80, and a first output port 92d that is connected to the oil passage 54 for the clutch C1; a spool that is slidable in the sleeve in the axial direction thereof; and a spring for urging the spool in the axial direction thereof. When the line pressure PL is supplied to the signal pressure input port 92a, the switching valve 90 cuts off the communication between the second input port 92c and the first output port 92d, and communicates the first input port 92b with the first output port 92d. This operation communicates the output port of the linear solenoid valve SL1 with the oil passage 54 for the clutch C1, and cuts off the communication between the discharge port 82b of the electromagnetic pump 80 and the oil passage 54 for the clutch C1. When the line pressure PL is not supplied to the signal pressure input port 72a, the switching valve 90 cuts off the communication between the first input port 92b and the first output port 92d, and communicates the second input port 92c with the first output port 92d. This operation cuts off the communication between the output port of the linear solenoid valve SL1 and the oil passage 54 for the clutch C1, and communicates the discharge port 82b of the electromagnetic pump 80 with the oil passage 54 for the clutch C1.

When the automobile 10 of the embodiment structured in the above-described manner is running with the shift lever 105 in the drive (D) position, the shift ECU 21 sets a target shift speed using a shift map and based on the accelerator operation amount obtained from the accelerator pedal position sensor 102 and the vehicle speed obtained from the vehicle speed sensor 108, and, based on the target shift speed thus set, controls the drive of the hydraulic control device 50 (such as the linear solenoid valve SLT and the linear solenoid valve SL1) so as to engage and disengage the clutches C1 and C2 and the brakes B1 to B3.

While the engine 12 is running, the power from the engine 12 operates the oil pump 40 and the primary regulator valve 60 generates the line pressure PL, so that the switching valve 90 is brought into the state of communicating the output port of the linear solenoid valve SL1 with the oil passage 54 for the clutch C1, and cutting off the communication between the discharge port 82b of the electromagnetic pump 80 and the oil passage 54 for the clutch C1. As a result, when the clutch C1 is to be engaged according to the target shift speed, the hydraulic pressure Psl1 can be applied from the linear solenoid valve SL1 to the clutch C1 to engage the clutch C1. In the same manner, when any of the clutch C2 and the brakes B1 to B3 is to be engaged according to the target shift speed, a hydraulic pressure can be applied from any of the linear solenoid valves SL2 to SL4 to corresponding one of the clutch C2 and the brakes B1 to B3 to engage the corresponding clutch or brake.

When the automobile 10 of the embodiment is running with the shift lever 105 in the drive (D) position, the engine 12 automatically stops if all preset automatic stop conditions, such as the vehicle speed being zero, the accelerator pedal being off, and the brake switch signal being on, are satisfied. After the engine 12 has automatically stopped, the engine 12 automatically starts when preset automatic start conditions, such as the brake switch signal being off, are satisfied.

While the engine 12 is automatically stopped, the electromagnetic pump 80 is operated to increase the pressure of the hydraulic oil suctioned through the suction port 82a and discharge the hydraulic oil at the increased pressure from the discharge port 82b (pressure-feed the hydraulic oil toward the switching valve 90). Consider a case in which the automatic stop conditions are satisfied, and the engine 12 has automatically stopped. In this case, the oil pump 40 stops, so that the line pressure PL drops. This brings the switching valve 90 into the state of cutting off the communication between the output port of the linear solenoid valve SL1 and the oil passage 54 for the clutch C1, and communicating the discharge port 82b of the electromagnetic pump 80 with the oil passage 54 for the clutch C1. As a result, the hydraulic pressure can be applied to the clutch C1 to be engaged at a start of the vehicle by pressure-feeding the hydraulic oil with the electromagnetic pump 80. Thereafter, when the automatic start conditions are satisfied and the engine 12 automatically starts, the oil pump 40 operates to supply the line pressure PL. This brings the switching valve 90 into the state of communicating the output port of the linear solenoid valve SL1 with the oil passage 54 for the clutch C1, and cutting off the communication between the discharge port 82b of the electromagnetic pump 80 and the oil passage 54 for the clutch C1. At this time, the clutch C1 can be fully engaged to start the vehicle by applying the hydraulic pressure Psl1 from the linear solenoid valve SL1 to the clutch C1. In this manner, the electromagnetic pump 80 is driven to apply the hydraulic pressure to the clutch C1 while the engine 12 is automatically stopped, so that the clutch C1 can be quickly engaged by the hydraulic pressure from the linear solenoid valve SL1 immediately after the engine 12 automatically starts. This enables a smooth start of the vehicle involving the automatic start of the engine 12.

The following describes a layout in the vicinity of the strainer 42, the oil pump 40, and the electromagnetic pump 80. FIGS. 5 to 8 are layout drawings showing states of the vicinity of the strainer 42, the oil pump 40, and the electromagnetic pump 80, as viewed from the upper rear right side, the upper side, the rear side, and the left side, respectively, of the vehicle. FIG. 9 is a layout drawing schematically showing a state (layout) of the valve body VB, valves (such as the primary regulator valve 60) of the hydraulic control device 50, and the electromagnetic pump 80, as viewed from the lower side of the vehicle. Taking ease of viewing into consideration, FIGS. 6 to 8 do not show the oil passage 43. In FIG. 9, the valve body VB is fixed to the transmission case 22 so as to be orthogonal to the plane of the paper (from the lower side of the vehicle in the case of a transmission in which the valve body VB is provided on the lower side of the transmission).

Figure 5:
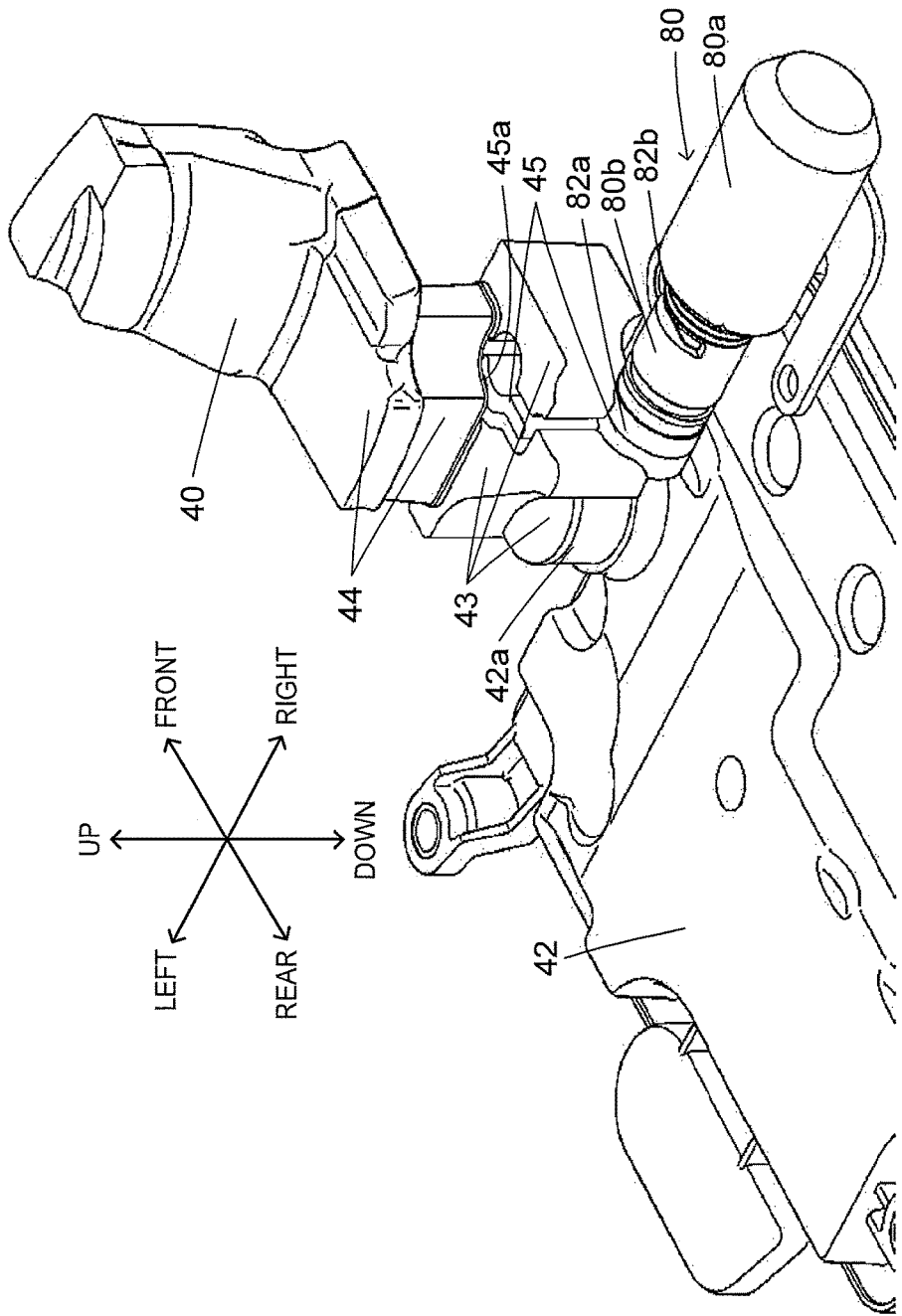
FIG. 5 is a layout drawing showing a state of the vicinity of the strainer, the oil pump, and an electromagnetic pump, as viewed from the upper rear right side of a vehicle.

As shown in FIG. 5, the outlet port 42a of the strainer 42, the oil passage 43 formed in the valve body VB, and the oil passage 44 formed in the transmission case 22 are arranged in this order from the lower side of the vehicle on the vehicle front side of the valve body VB. As shown in FIGS. 5 to 8, the outlet port 42a of the strainer 42 and the oil passage 44 are located so as to be at a relatively small distance from each other in the vehicle front-rear direction and in the vehicle right-left direction. This is for the purpose of facilitating the oil pump 40 in suctioning the hydraulic oil stored in the hydraulic oil reservoir 41 through the strainer 42, the oil passages 43 and 44, and the suction port 40a.

As shown in FIGS. 5 to 9, the electromagnetic pump 80 is placed such that a spool (not shown) moves in the vehicle right-left direction (such that the suction port 82a and the discharge port 82b are arranged side by side in the vehicle right-left direction). This is for the purpose of suppressing a situation where, when the vehicle accelerates or decelerates, a force (load) due to the acceleration or the deceleration is applied to the electromagnetic pump 80 and hinders the spool from sliding in the axial direction thereof. As shown in FIGS. 5 to 7 and 9, the electromagnetic pump 80 is mounted on the valve body VB such that the pump unit 80b is placed between the electromagnetic unit 80a and the outlet port 42a of the strainer 42, that is, such that the suction port 82a of the pump unit 80a is located on the outlet port 42a side (mounting port 43a side) of the strainer 42. Therefore, the oil passage 45 communicating the oil passage 44 with the electromagnetic pump 80 can be shorter than that of a structure in which the electromagnetic pump 80 is mounted on the valve body VB such that the pump unit 80b is placed farther from the outlet port 42a of the strainer 42 than the electromagnetic unit 80a is. Moreover, as shown in FIGS. 5 to 8, the oil passage 45 is provided upright so as not to overlap the electromagnetic unit 80a when viewed from the vehicle up-down direction and so as to be substantially parallel to the vehicle up-down direction. This arrangement can further shorten the oil passage 45. These arrangements can reduce the suction resistance of the electromagnetic pump 80 (resistance of the oil passage 45), and thus can more easily ensure the hydraulic pressure applied to the clutch C1. As a result, a second pump can be reduced in size. The oil passage 45 may slightly overlap the electromagnetic unit 80a when viewed from the vehicle up-down direction, or may slightly incline relative to the vehicle up-down direction.

As shown in FIG. 9, the electromagnetic pump 80 is mounted on the valve body VB on a side closer to the vehicle front side (engine 12 side) than all the valves (such as the primary regulator valve 60, the secondary regulator valve 70, and the switching valve 90) of the hydraulic control device 50 are. Specifically, the suction port 82a in the pump unit 80b of the electromagnetic pump 80, the outlet port 42a of (mounting port 43a for) the strainer 42, and the discharge port 40b of (connection port 52a for) the oil pump 40 are arranged closer to the vehicle front side (engine 12 side) than the primary regulator valve 60 is, and all the valves of the hydraulic control device 50, except the primary regulator valve 60, are arranged closer to the vehicle rear side than the primary regulator valve 60 is. As described above, the oil passages 43 and 44 are located on the vehicle front side of the valve body VB, so that the electromagnetic pump 80 can be said to be mounted on the valve body VB in a position closer to the oil passages 43 and 44 than all the valves of the hydraulic control device 50 are. Accordingly, also from this point of view, it can be said that the oil passage 45 can be shortened, that the suction resistance of the electromagnetic pump 80 (resistance of the oil passage 45) can be reduced, and that the hydraulic pressure applied to the clutch C1 can be more easily ensured. In general, the clutch C1 is often placed near the vehicle front side of the valve body VB. Hence, by mounting the electromagnetic pump 80 on the valve body VB on a side closer to the vehicle front side (engine 12 side) than all the valves of the hydraulic control device 50 are, distances from the discharge port 82b of the electromagnetic pump 80 to parts (such as the switching valve 90) of the hydraulic control device 50 interposed between the electromagnetic pump 80 and the clutch C1 can be reduced. As shown in FIG. 9, a row of the suction port 82a in the pump unit 80b of the electromagnetic pump 80, the outlet port 42a of (mounting port 43a for) the strainer 42, and the discharge port 40b of (connection port 52a for) the oil pump 40 is arranged in parallel with the extending direction of the primary regulator valve 60. This arrangement can reduce the distance of a part of the oil passage 52 between the oil pump 40 and the primary regulator valve 60 to a relatively small value.

Figure 6:
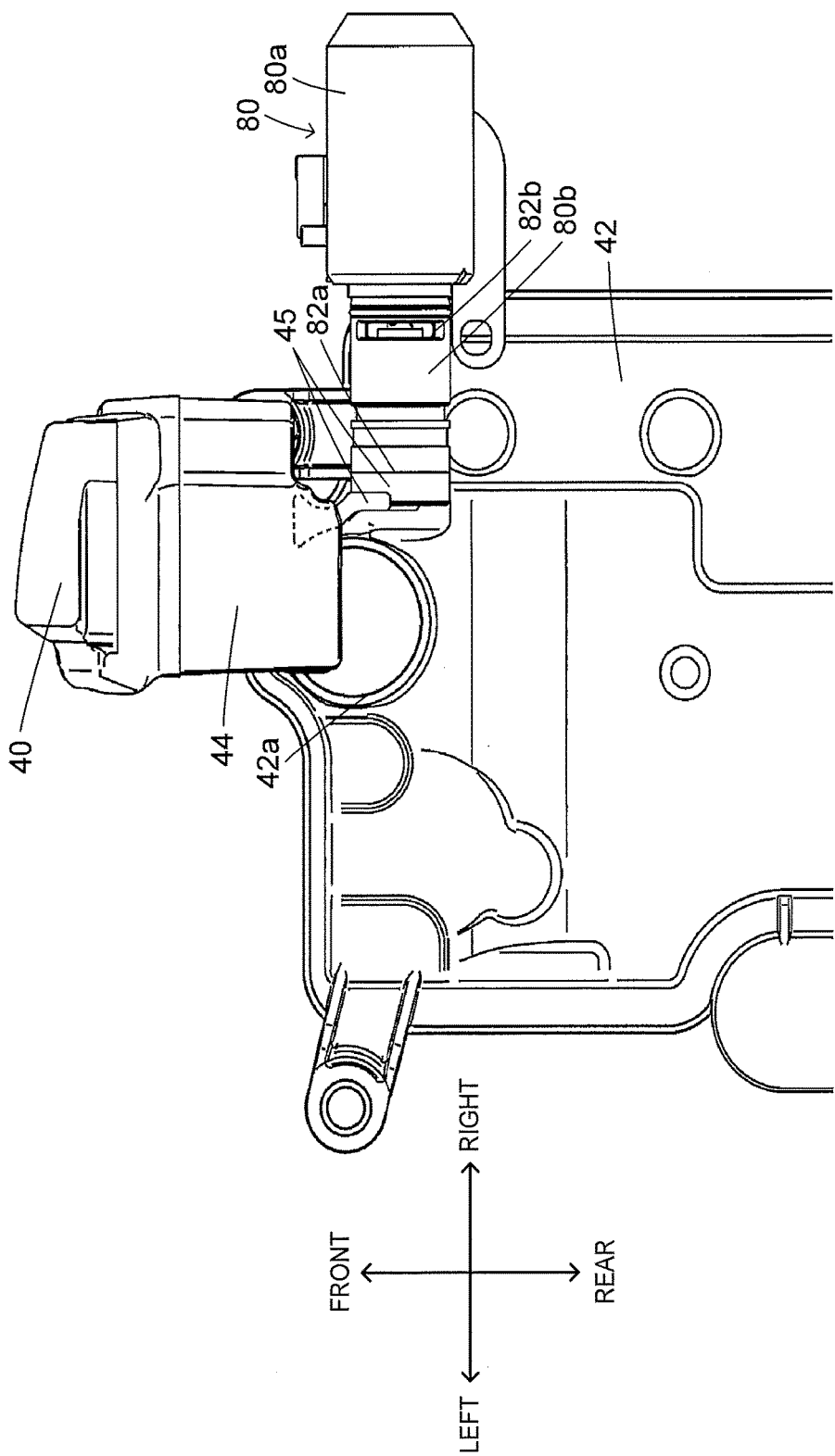
FIG. 6 is a layout drawing showing the state of the vicinity of the strainer, the oil pump, and the electromagnetic pump, as viewed from the upper side of the vehicle.
Figure 7:
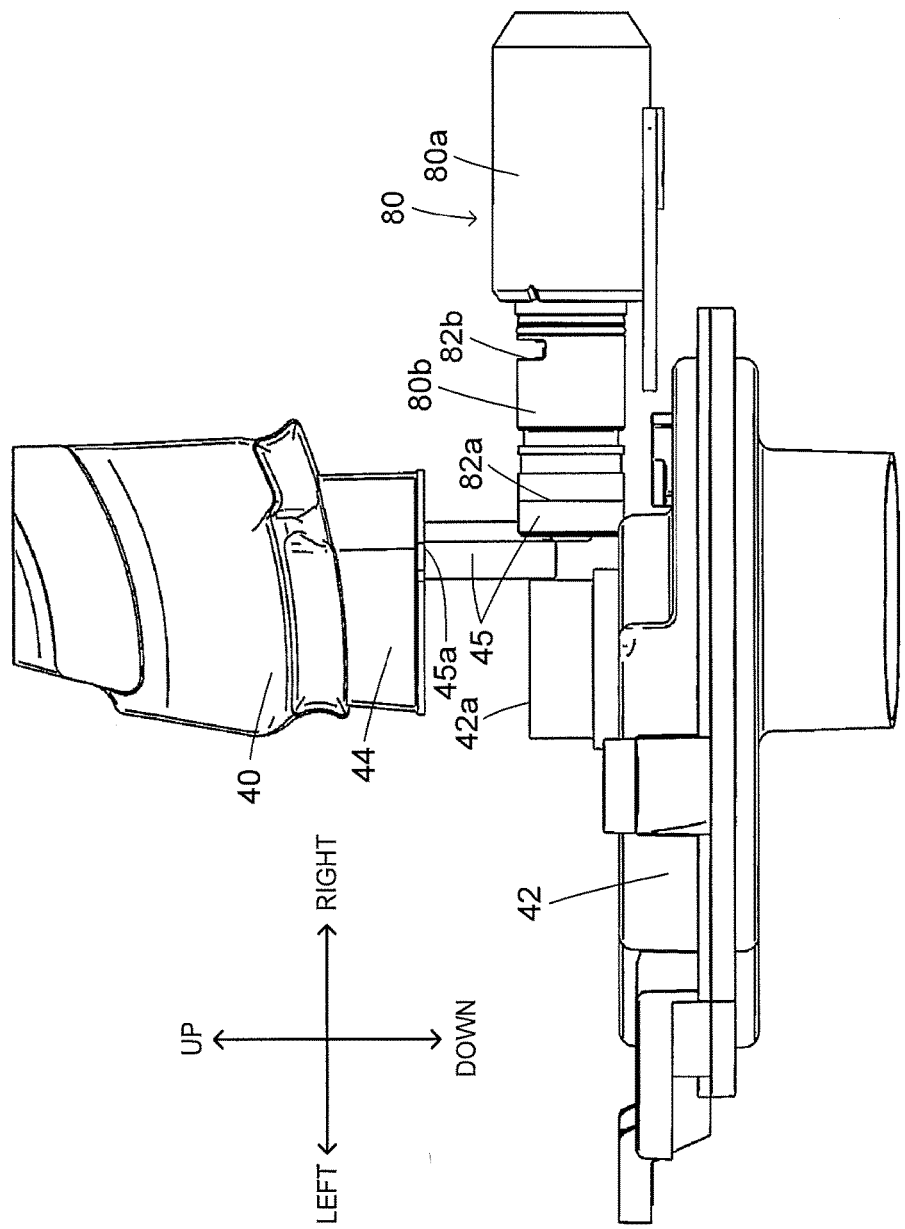
FIG. 7 is a layout drawing showing the state of the vicinity of the strainer, the oil pump, and the electromagnetic pump, as viewed from the rear side of the vehicle.

As shown in FIGS. 5 to 8, the oil passage 44, the oil passage 45 formed in the valve body VB, and the suction port 82a of the electromagnetic pump 80 are arranged in this order from the upper side of the vehicle. That is, the oil passage 45 is formed so as to extend downward relative to the horizontal direction over the whole range thereof from a communicating position 45a with the oil passage 44 toward the suction port 82a. The suction port 82a of the electromagnetic pump 80 overlaps the oil passage 44 in the vehicle up-down direction when viewed from vehicle front-rear direction, as shown in FIGS. 5 to 7. The suction port 82a of the electromagnetic pump 80 overlaps the outlet port 42a of the strainer 42 when viewed from the vehicle right-left direction, as shown in FIGS. 5, 6, 8, and 9. Specifically, the suction port 82a in the pump unit 80b of the electromagnetic pump 80, the outlet port 42a of (mounting port 43a for) the strainer 42, and the discharge port 40b of (connection port 52a for) the oil pump 40 are arranged in this order substantially in a row in the vehicle right-left direction. As described above, the valve body VB is fixed to the transmission case 22 so as to be orthogonal to the plane of the paper in FIG. 9 (from the lower side of the vehicle in the case of a transmission in which the valve body VB is provided on the lower side of the transmission). The automobile 10 is structured as a rear-wheel-drive vehicle, so that the axial direction of the transmission 30 corresponds to the vehicle front-rear direction. Accordingly, the suction port 82a, the outlet port 42a of the strainer 42, and the discharge port 40b of the oil pump 40 can be said to be arranged substantially in a row in a direction orthogonal to the direction of mounting the valve body VB to the transmission case 22 (vehicle up-down direction) and also orthogonal to the axial direction of the transmission 30 (vehicle front-rear direction). These arrangements can reduce the distances in the vehicle front-rear direction and the vehicle right-left direction between the oil passage 44 and the suction port 82a of the electromagnetic pump 80. In particular, in the embodiment, the distance in the vehicle right-left direction between the oil passage 44 and the suction port 82a of the electromagnetic pump 80 can be reduced to be smaller (substantially to zero).

Consider the following case: the automatic stop conditions are satisfied, so that the engine 12 has automatically stopped, and, as a preparation for starting the vehicle afterward, the electromagnetic pump 80 is driven to apply the hydraulic pressure to the clutch C1. In an automobile having the same structure as that of the embodiment, that is, in an automobile provided with the strainer 42, the oil pump 40, the electromagnetic pump 80, and the oil passages 43, 44, and 45, air may be accumulated in upper parts of the oil passages 43 and 44 (oil passage 44, in particular). If the oil passage 45 extends horizontally or upward relative to the horizontal direction from the communicating position 45a with the oil passage 44 toward the suction port 82a, the air, when accumulated in the upper parts of the oil passages 43 and 44, may reach the oil passage 45, and eventually the electromagnetic pump 80, so that the electromagnetic pump 80 may suction the air. If the electromagnetic pump 80 suctions the air, the hydraulic pressure applied from the electromagnetic pump 80 to the clutch C1 drops (becomes insufficient). Hence, when, thereafter, the engine 12 is automatically started to engage the clutch C1 by the hydraulic pressure from the linear solenoid valve SL1, engaging the clutch C1 may require a long time, so that the startability of the vehicle may be degraded.

In contrast, in the embodiment, the oil passage 45 is formed so as to extend downward relative to the horizontal direction over the whole range thereof from the communicating position 45a with the oil passage 44 toward the suction port 82a. This structure can restrain the air (air accumulation) accumulated in the oil passage 44 from reaching the oil passage 45 or the suction port 82a of the electromagnetic pump 80, and thus can restrain the electromagnetic pump 80 from suctioning the air. As a result, when the hydraulic pressure needs to be applied from the electromagnetic pump 80 to the clutch C1, the hydraulic pressure applied from the electromagnetic pump 80 to the clutch C1 can be restrained from dropping. When, thereafter, the engine 12 is automatically started to engage the clutch C1 by the hydraulic pressure from the linear solenoid valve SLC1, the time required to engage the clutch C1 can be restrained from increasing, so that the startability of the vehicle can be restrained from degrading.

Moreover, in the embodiment, the suction port 82a of the electromagnetic pump 80 overlaps the oil passage 44 in the vehicle up-down direction when viewed from the vehicle front-rear direction, and also overlaps (is arranged side by side with) the outlet port 42a of (mounting port 43a for) the strainer 42 when viewed from the vehicle right-left direction to reduce the distances in the vehicle front-rear direction and the vehicle right-left direction between the oil passage 44 and the suction port 82a of the electromagnetic pump 80. Compared with a structure in which the oil passage 45 is longer in the vehicle front-rear direction or the vehicle right-left direction, this structure can restrain the air (air accumulation) accumulated in the oil passage 44 from reaching the oil passage 45 or the suction port 82a of the electromagnetic pump 80, and thus can restrain the electromagnetic pump 80 from suctioning the air, unless the automobile 10 more greatly inclines in the vehicle front-rear direction or the vehicle right-left direction. In particular, the distance in the vehicle right-left direction between the oil passage 44 and the suction port 82a of the electromagnetic pump 80 is reduced to be smaller (substantially to zero), so that this structure provides a greater effect when the automobile 10 inclines in the vehicle right-left direction.

In the power transmission device 20 of the embodiment described above, the outlet port 42a of the strainer 42 communicates with the oil pump 40 through the oil passages 43 and 44, and the oil passage 44 communicates with the electromagnetic pump 80 through the oil passage 45. The electromagnetic pump 80 is mounted on the valve body VB such that the pump unit 80b is placed between the electromagnetic unit 80a and the outlet port 42a of the strainer 42. Therefore, the oil passage 45 communicating the oil passage 44 with the electromagnetic pump 80 can be shorter than that of a structure in which the electromagnetic pump 80 is mounted on the valve body VB such that the pump unit 80b is placed farther from the outlet port 42a of the strainer 42 than the electromagnetic unit 80a is. Moreover, the oil passage 45 is provided upright so as not to overlap the electromagnetic unit 80a when viewed from the vehicle up-down direction and so as to be substantially parallel to the vehicle up-down direction. This arrangement can further shorten the oil passage 45. These arrangements can reduce the suction resistance of the electromagnetic pump 80 (resistance of the oil passage 45), and thus can more easily ensure the hydraulic pressure applied to the clutch C1.

In the power transmission device 20 of the embodiment, the suction port 82a in the pump unit 80b of the electromagnetic pump 80, the outlet port 42a of (mounting port 43a for) the strainer 42, and the discharge port 40b of (connection port 52a for) the oil pump 40 are arranged side by side in this order. Accordingly, also from this point of view, it can be said that the oil passage 45 can be shortened, that the suction resistance of the electromagnetic pump 80 (resistance of the oil passage 45) can be reduced, and that the hydraulic pressure applied to the clutch C1 can be more easily ensured.

Moreover, in the power transmission device 20 of the embodiment, the outlet port 42a of the strainer 42 communicates with the oil pump 40 through the oil passages 43 and 44 on the vehicle front side (engine 12 side) of the valve body VB, and the electromagnetic valve 80 is mounted on the valve body VB on a side of the valve body VB closer to the vehicle front side than all the valves (such as the primary regulator valve 60) of the hydraulic control device 50 are. Accordingly, also from this point of view, it can be said that the oil passage 45 can be shortened, that the suction resistance of the electromagnetic pump 80 (resistance of the oil passage 45) can be reduced, and that the hydraulic pressure applied to the clutch C1 can be more easily ensured.

In the power transmission device 20 of the embodiment, the oil passage 45 is formed so as to extend downward relative to the horizontal direction over the whole range thereof from the communicating position 45a with the oil passage 44 toward the suction port 82a. This structure can restrain the air (air pocket) accumulated in the oil passage 44 from reaching the oil passage 45 or the suction port 82a of the electromagnetic pump 80, and thus can restrain the electromagnetic pump 80 from suctioning the air. As a result, when the hydraulic pressure needs to be applied from the electromagnetic pump 80 to the clutch C1, the hydraulic pressure applied from the electromagnetic pump 80 to the clutch C1 can be restrained from dropping. When, thereafter, the engine 12 is automatically started to engage the clutch C1 by the hydraulic pressure from the linear solenoid valve SLC1, the time required to engage the clutch C1 can be restrained from increasing, so that the startability of the vehicle can be restrained from degrading. Moreover, in the embodiment, the suction port 82a of the electromagnetic pump 80 is located on the vehicle lower side of the oil passage 44 while overlapping the oil passage 44 in the vehicle up-down direction when viewed from the vehicle front-rear direction, and overlaps the outlet port 42a of the strainer 42 when viewed from the vehicle right-left direction. This structure can restrain the air (air accumulation) accumulated in the oil passage 44 from reaching the oil passage 45 or the suction port 82a of the electromagnetic pump 80, and thus can restrain the electromagnetic pump 80 from suctioning the air, unless the automobile 10 more greatly inclines in the vehicle front-rear direction or the vehicle right-left direction.

In the power transmission device 20 of the embodiment, the suction port 82a of the electromagnetic pump 80 overlaps (is arranged side by side with) the outlet port 42a of the strainer 42 and does not overlap the oil passage 44 in the vehicle up-down direction when viewed from the vehicle right-left direction, as shown in FIG. 8. However, the suction port 82a may overlap the oil passage 44 in the vehicle up-down direction when viewed from the vehicle right-left direction. This arrangement can further reduce the distance in the vehicle front-rear direction between the oil passage 44 and the suction port 82a of the electromagnetic pump 80, and thus provides a greater effect when the automobile 10 inclines in the vehicle front-rear direction. The suction port 82a of the electromagnetic pump 80 may naturally be arranged so as to overlap the outlet port 42a of the strainer 42 and also overlap the oil passage 44 in the vehicle up-down direction when viewed from the vehicle right-left direction. In this case, the suction port 82a of the electromagnetic pump 80 may be arranged so as not to overlap the oil passage 44 in the vehicle up-down direction when viewed from the vehicle front-rear direction.

In the power transmission device 20 of the embodiment, the suction port 82a of the electromagnetic pump 80 is located on the vehicle lower side of the oil passage 44 while overlapping the oil passage 44 in the vehicle up-down direction when viewed from the vehicle front-rear direction, and overlaps the outlet port 42a of the strainer 42 when viewed from the vehicle right-left direction. However, the oil passage 45 only needs to be formed so as to extend downward relative to the horizontal direction over the whole range thereof from the communicating position 45a with the oil passage 44 toward the suction port 82a. The suction port 82a of the electromagnetic pump 80 may be arranged so as not to overlap the oil passage 44 in the vehicle up-down direction when viewed from the vehicle front-rear direction, or may be arranged so as not to overlap the outlet port 42a of the strainer 42 and not to overlap the oil passage 44 in the vehicle up-down direction, when viewed from the vehicle right-left direction. This case involves an increase in the distances in the vehicle front-rear direction and the vehicle right-left direction between the oil passage 44 and the suction port 82a of the electromagnetic pump 80. However, compared with a structure in which the oil passage 45 is formed so as to extend horizontally or upward relative to the horizontal direction from the communicating position 45a with the oil passage 44 toward the suction port 82a, the structure in this case can restrain the air (air accumulation), when accumulated in an upper part of the oil passage 44, from reaching the oil passage 45 or the suction port 82a of the electromagnetic pump 80, and thus can restrain the electromagnetic pump 80 from suctioning the air.

In the power transmission device 20 of the embodiment, the oil passage 45 is formed so as to extend downward relative to the horizontal direction over the whole range thereof from the communicating position 45a with the oil passage 44 toward the suction port 82a. However, provided that the strainer 42 communicates with the oil pump 40 on an end side (on the vehicle front side in the embodiment) of the valve body VB through the oil passages 43 and 44 and that the electromagnetic valve 80 is mounted on the valve body VB on a side of the valve body VB closer to the above-described end side than all the valves of the hydraulic control device 50 are, the oil passage 45 may be formed so as to extend horizontally or slightly upward relative to the horizontal direction from the communicating position 45a with the oil passage 44 toward the suction port 82a.

In the power transmission device 20 of the embodiment, the suction port 82a in the pump unit 80b of the electromagnetic pump 80, the outlet port 42a of (mounting port 43a for) the strainer 42, and the discharge port 40b of (connection port 52a for) the oil pump 40 are arranged in this order substantially in a row in the vehicle right-left direction. However, these ports need not be arranged substantially in a row, provided that these ports are arranged side by side in the above-described order.

In the power transmission device 20 of the embodiment, the suction port 82a in the pump unit 80b of the electromagnetic pump 80, the outlet port 42a of (mounting port 43a for) the strainer 42, and the discharge port 40b of (connection port 52a for) the oil pump 40 are arranged in this order substantially in a row in the vehicle right-left direction, and the electromagnetic pump 80 is mounted on the valve body VB such that the suction port 82a of the pump unit 80a is located on the outlet port 42a side (mounting port 43a side) of the strainer 42. However, provided that the suction port 82a in the pump unit 80b of the electromagnetic pump 80, the outlet port 42a of (mounting port 43a for) the strainer 42, and the discharge port 40b of (connection port 52a for) the oil pump 40 are arranged side by side in this order in the vehicle right-left direction, the electromagnetic pump 80 may be mounted on the valve body VB such that the suction port 82a of the pump unit 80a is located on a side opposite to the outlet port 42a (mounting port 43a) of the strainer 42.

In the power transmission device 20 of the embodiment, the primary regulator valve 60 is placed near the row of the suction port 82a in the pump unit 80b of the electromagnetic pump 80, the outlet port 42a of (mounting port 43a for) the strainer 42, and the discharge port 40b of (connection port 52a for) the oil pump 40. However, the primary regulator valve 60 need not be placed near the row of these ports.

The power transmission device 20 of the embodiment is mounted on the rear-wheel-drive vehicle, and in the power transmission device 20, the strainer 42 communicates with the oil pump 40 on the vehicle front side of the valve body VB through the oil passages 43 and 44, and the electromagnetic valve 80 is mounted on the valve body VB on a side of the valve body VB closer to the vehicle front side (at a location closer to the oil passages 43 and 44) than all the valves (such as the primary regulator valve 60) of the hydraulic control device 50 are. However, the power transmission device 20 may be structured such that the strainer 42 communicates with the oil pump 40 on an end side other than the vehicle front side of the valve body VB through the oil passages 43 and 44, and that the electromagnetic valve 80 is mounted on the valve body VB on a side of the valve body VB closer to the above-described end side than all the valves of the hydraulic control device 50 are.

The power transmission device 20 of the embodiment is mounted on the automobile 10 structured as a rear-wheel-drive vehicle. However, the power transmission device 20 may be mounted on a front-wheel-drive vehicle. Also in this case, the power transmission device 20 only needs to be structured such that the strainer 42 communicates with the oil pump 40 on an end side of the valve body VB through the oil passages 43 and 44, and that the electromagnetic valve 80 is mounted on the valve body VB on a side of the valve body VB closer to the above-described end side than all the valves of the hydraulic control device 50 are.

The power transmission device 20 of the embodiment includes the electromagnetic pump 80 that is operated by the electromagnetic force. However, the power transmission device 20 may include an electric pump that is operated by power from an electric motor.

The power transmission device 20 of the embodiment includes the six-speed transmission 30. However, the transmission 30 is not limited to the six-speed transmission, and the power transmission device 20 may include a transmission providing any number of shift speeds, such as a four-speed, a five-speed, or an eight-speed transmission.

The vehicle provided with the power transmission device 20 of the embodiment includes the engine 12 as a motor, but may include, for example, an electric motor other than the engine.

A power transmission device of the present disclosure will be described below.

A first power transmission device of the present disclosure is a power transmission device that is mounted on a vehicle and includes a transmission including a plurality of engagement elements for transmitting power from a motor to axles, a case to accommodate the transmission, and a hydraulic control device to control hydraulic pressure to the engagement elements. The first power transmission device includes a hydraulic oil reservoir that stores hydraulic oil and a first pump that is operated by the power from the motor and that suctions the hydraulic oil from the hydraulic oil reservoir through a strainer and supplies the hydraulic oil to the hydraulic control device, and wherein the hydraulic control device includes: a second pump that is operated by receiving supply of electric power and that suctions the hydraulic oil and supplies the hydraulic oil to a starting engagement element among the engagement elements that is engaged to start the vehicle; a discharge port that discharges the hydraulic oil from the first pump; a mounting port for the strainer that communicates with the first pump and to which the strainer is mounted; a first oil passage that communicates the mounting port for the strainer with the first pump; and a second oil passage that communicates the first oil passage with the second pump, and also in that an input/output port group composed of a suction port of the second pump, the mounting port for the strainer, and the discharge port, which are arranged side by side in this order.

In the first power transmission device of the present disclosure, the hydraulic control device includes: the second pump that is operated by receiving the supply of the electric power and that suctions the hydraulic oil and supplies the hydraulic oil to the starting engagement element among the engagement elements that is engaged to start the vehicle; the discharge port that discharges the hydraulic oil from the first pump; the mounting port for the strainer that communicates with the first pump and to which the strainer is mounted; the first oil passage that communicates the mounting port for the strainer with the first pump; and the second oil passage that communicates the first oil passage with the second pump. The input/output port group composed of the suction port of the second pump, the mounting port for the strainer, and the discharge port, which are arranged side by side in this order. This structure allows the second oil passage to be shorter and thus the oil passage resistance (suction resistance of the second pump) to be lower. As a result, sufficient hydraulic pressure can be more easily applied from the second pump to the starting engagement element.

In the first power transmission device of the present disclosure described above, the second pump may include an electromagnetic unit and a pump unit, and the second pump may be placed such that the suction port of the pump unit is oriented toward the mounting port for the strainer. This structure allows the second oil passage to be shorter than that of a structure in which the suction port of the pump unit is oriented toward a side opposite to the mounting port for the strainer.

In the first power transmission device of the present disclosure, the input/output port group may be arranged in a row in a direction orthogonal to a direction of mounting the hydraulic control device to the case member of the transmission, and also orthogonal to an axial direction of the transmission. This structure allows the second oil passage to be further shorter.

Moreover, in the first power transmission device of the present disclosure, the hydraulic control device may include a pressure regulator valve that regulates pressure of the hydraulic oil discharged from the first pump, and the input/output port group may be arranged in parallel with the pressure regulator valve. This structure can reduce the distance between the discharge port of the first pump and the pressure regulator valve.

In the first power transmission device according to this aspect of the present disclosure in which the pressure regulator valve is placed close to the input/output port group, the hydraulic control device may further include a plurality of control valves that control the hydraulic pressure, and the input/output port group may be arranged on one side of the pressure regulator valve in the axial direction of the transmission while the control valves may be arranged on the other side of the pressure regulator valve in the axial direction of the transmission.

In the first power transmission device according to this aspect of the present disclosure in which the hydraulic control device includes the control valves, the input/output port group may be arranged on a side closer to an internal combustion engine than the control valves are in the axial direction of the transmission.

A second power transmission device of the present disclosure is a power transmission device that is mounted on a vehicle and includes a transmission including a plurality of engagement elements for transmitting power from a motor to axles, a case to accommodate the transmission, and a hydraulic control device to control hydraulic pressure to the engagement elements. The second power transmission device is includes a hydraulic oil reservoir that stores hydraulic oil and a first pump that is operated by the power from the motor and that suctions the hydraulic oil from the hydraulic oil reservoir through a strainer and supplies the hydraulic oil to the hydraulic control device, and wherein the hydraulic control device includes: a second pump that is operated by receiving supply of electric power and that suctions the hydraulic oil and supplies the hydraulic oil to a starting engagement element among the engagement elements that is engaged to start the vehicle; a discharge port that discharges the hydraulic oil from the first pump; a mounting port for the strainer that communicates with the first pump and to which the strainer is mounted; a first oil passage that communicates the mounting port for the strainer with the first pump; a second oil passage that communicates the first oil passage with the second pump; and a plurality of control valves that control the hydraulic pressure, and also in that a suction port of the second pump and the mounting port for the strainer are arranged side by side in this order in a direction orthogonal to a direction of mounting the hydraulic control device to the case member of the transmission, and also orthogonal to an axial direction of the transmission, and the suction port of the second pump and the mounting port for the strainer are arranged on a side closer to an internal combustion engine than the control valves are in the axial direction of the transmission.

In the second power transmission device of the present disclosure, the hydraulic control device includes: the second pump that is operated by receiving the supply of the electric power and that suctions the hydraulic oil and supplies the hydraulic oil to the starting engagement element among the engagement elements that is engaged to start the vehicle; the discharge port that discharges the hydraulic oil from the first pump; the mounting port for the strainer that communicates with the first pump and to which the strainer is mounted; the first oil passage that communicates the mounting port for the strainer with the first pump; the second oil passage that communicates the first oil passage with the second pump; and the control valves that control the hydraulic pressure. The suction port of the second pump and the mounting port for the strainer are arranged side by side in this order in the direction orthogonal to the direction of mounting the hydraulic control device to the case member of the transmission, and also orthogonal to the axial direction of the transmission. The suction port of the second pump and the mounting port for the strainer are arranged on a side closer to the internal combustion engine than the control valves are in the axial direction of the transmission. This structure allows the second oil passage to be shorter and thus the oil passage resistance (suction resistance of the second pump) to be lower. As a result, sufficient hydraulic pressure can be more easily applied from the second pump to the starting engagement element.

A third power transmission device of the present disclosure is a power transmission device that is mounted on a vehicle and includes a transmission including a plurality of engagement elements for transmitting power from a motor to axles, a case to accommodate the transmission, and a hydraulic control device to control hydraulic pressure to the engagement elements. The third power transmission device is summarized as including a hydraulic oil reservoir that stores hydraulic oil; a first pump that is operated by the power from the motor and that suctions the hydraulic oil from the hydraulic oil reservoir through a strainer and supplies the hydraulic oil to the hydraulic control device; a second pump that is operated by receiving supply of electric power and that suctions the hydraulic oil and supplies the hydraulic oil to a starting engagement element among the engagement elements that is engaged to start the vehicle; a first oil passage that communicates an outlet port of the strainer with the first pump; and a second oil passage that communicates the first oil passage with the second pump, and is summarized in that the second pump includes an electromagnetic unit and a pump unit, and is mounted on a valve body of the hydraulic control device such that the pump unit is placed between the electromagnetic unit and the outlet port of the strainer.

The third power transmission device of the present disclosure includes the first oil passage that communicates the outlet port of the strainer with the first pump and the second oil passage that communicates the first oil passage with the second pump, and the second pump includes the electromagnetic unit and the pump unit, and is mounted on the valve body of the hydraulic control device such that the pump unit is placed between the electromagnetic unit and the outlet port of the strainer. This structure allows the second oil passage to be shorter and thus the oil passage resistance (suction resistance of the second pump) to be lower than in the case of mounting the second pump on the valve body such that the pump unit is placed farther from the outlet port of the strainer than the electromagnetic unit is. As a result, sufficient hydraulic pressure can be more easily applied from the second pump to the starting engagement element.

In the third power transmission device of the present disclosure described above, the second oil passage may not overlap the electromagnetic unit when viewed from a vehicle up-down direction. In the third power transmission device according to this aspect of the present disclosure, the second oil passage may be provided upright in parallel with the vehicle up-down direction. This structure allows the second oil passage to be further shorter.

In the third power transmission device of the present disclosure, the first oil passage may include a body-side oil passage that is formed in the valve body and communicates with the strainer, and may also include a case-side oil passage that is formed in the case and communicates the body-side oil passage with the first pump; the second oil passage may be formed in the valve body and communicates the case-side oil passage with the second pump; and the second pump may be mounted on the valve body at a location closer to the case-side oil passage than all valves of the hydraulic control device are.

In the third power transmission device according to this aspect of the present disclosure in which the second oil passage communicates the case-side oil passage included in the first oil passage with the second pump, the case-side oil passage, the second oil passage, and the suction port of the second pump may be arranged in this order from an upper side of the vehicle, and the suction port of the second pump may overlap the case-side oil passage in a vehicle up-down direction when viewed from at least one of a vehicle front-rear direction and a vehicle right-left direction. This structure can reduce the distances in the vehicle front-rear direction and the vehicle right-left direction between the case-side oil passage and the second pump. As a result, if air is accumulated in an upper part of the case-side oil passage, the air (air accumulation) can be restrained from reaching the second oil passage or the suction port of the second pump, and thus the second pump can be restrained from suctioning the air, unless the vehicle more greatly inclines. In the third power transmission device according to this aspect of the present disclosure, the suction port of the second pump may overlap the case-side oil passage in the vehicle up-down direction when viewed from the vehicle front-rear direction, and may overlap the outlet port of the strainer when viewed from the vehicle right-left direction.

In the third power transmission device of the present disclosure, the vehicle may be a rear-wheel-drive vehicle; the first oil passage may communicate the strainer with the first pump on a vehicle front side of the valve body; and the second pump may be mounted on the valve body on a side closer to the vehicle front side than all valves of the hydraulic control device are.

The third power transmission device of the present disclosure may further include a switching valve that establishes, when the starting engagement element is to be engaged, a first state in which the hydraulic oil discharged from the first pump and regulated in pressure is supplied to the starting engagement element when the first pump is in operation, and a second state in which the hydraulic oil discharged from the second pump is supplied to the starting engagement element when the first pump is not in operation.

The following describes correspondence relations between main elements of the embodiment and main elements of the disclosure described in the summary of the disclosure. In the embodiment, the transmission 30 corresponds to a "transmission", the transmission case 22 corresponds to a "case", the hydraulic control device 50 corresponds to a "hydraulic control device", the hydraulic oil reservoir 41 corresponds to a "hydraulic oil reservoir", the oil pump 40 corresponds to a "first pump", the electromagnetic pump 80 corresponds to an "electromagnetic pump", the oil passages 43 and 44 correspond to a "first oil passage", and the oil passage 45 corresponds to a "second oil passage".

The correspondence relations between the main elements of the embodiment and the main elements of the disclosure described in the summary of the disclosure are merely examples for specifically explaining the modes for carrying out the disclosure described in the summary of the disclosure by use of the embodiment, and hence, do not limit the elements of the disclosure described in the summary of the disclosure. In other words, the disclosure described in the summary of the disclosure should be interpreted based on the description in the summery of the disclosure, and the embodiment is merely a specific example of the disclosure described in the summary of the disclosure.

The above embodiment was used to describe the modes for carrying out the present disclosure. However, the present disclosure is not particularly limited to the embodiment, but may naturally be carried out in various modes without departing from the scope of the present disclosure.

INDUSTRIAL APPLICABILITY

The present disclosure can be used, for example, in the manufacturing industry of power transmission devices.

The invention claimed is:

1. A power transmission device that is mounted on a vehicle, the power transmission device comprising:
a transmission including a plurality of engagement elements for transmitting power from a motor to axles;
a case to accommodate the transmission;
a hydraulic control device to control hydraulic pressure to the engagement elements;
a hydraulic oil reservoir that stores hydraulic oil; and
a first pump that is operated by the power from the motor and that suctions the hydraulic oil from the hydraulic oil reservoir through a strainer and supplies the hydraulic oil to the hydraulic control device, wherein
the hydraulic control device includes:
a second pump that is operated by receiving supply of electric power and that suctions the hydraulic oil and supplies the hydraulic oil to a starting engagement element among the engagement elements that is engaged to start the vehicle;
a discharge port that discharges the hydraulic oil from the first pump;
a mounting port for the strainer that communicates with the first pump and to which the strainer is mounted;
a first oil passage that communicates the mounting port for the strainer with the first pump; and
a second oil passage that communicates the first oil passage with the second pump, and
an input/output port group composed of a suction port of the second pump, the mounting port for the strainer, and the discharge port, which are arranged side by side in this order.

2. The power transmission device according to claim 1, wherein
the second pump includes an electromagnetic unit and a pump unit, and
the second pump is placed such that the suction port of the pump unit is oriented toward the mounting port for the strainer.

3. The power transmission device according to claim 2, wherein
the input/output port group is arranged in a row in a direction orthogonal to a direction of mounting the hydraulic control device to a case member of the transmission, and also orthogonal to an axial direction of the transmission.

4. The power transmission device according to claim 3, wherein
the hydraulic control device includes a pressure regulator valve that regulates pressure of the hydraulic oil discharged from the first pump, and
the input/output port group is arranged in parallel with the pressure regulator valve.

5. The power transmission device according to claim 4, wherein
the hydraulic control device further includes a plurality of control valves that control the hydraulic pressure, and
the input/output port group is arranged on one side of the pressure regulator valve in the axial direction of the transmission while the control valves are arranged on the other side of the pressure regulator valve in the axial direction of the transmission.

6. The power transmission device according to claim 5, wherein
the input/output port group is arranged on a side closer to an internal combustion engine than the control valves are in the axial direction of the transmission.

7. The power transmission device according to claim 1, wherein
the input/output port group is arranged in a row in a direction orthogonal to a direction of mounting the hydraulic control device to a case member of the transmission, and also orthogonal to an axial direction of the transmission.

8. The power transmission device according to claim 1, wherein
the hydraulic control device includes a pressure regulator valve that regulates pressure of the hydraulic oil discharged from the first pump, and
the input/output port group is arranged in parallel with the pressure regulator valve.

9. A power transmission device that is mounted on a vehicle, the power transmission device comprising:
a transmission including a plurality of engagement elements for transmitting power from a motor to axles;
a case to accommodate the transmission;
a hydraulic control device to control hydraulic pressure to the engagement elements;
a hydraulic oil reservoir that stores hydraulic oil; and a first pump that is operated by the power from the motor and that suctions the hydraulic oil from the hydraulic oil reservoir through a strainer and supplies the hydraulic oil to the hydraulic control device, wherein
the hydraulic control device includes:
 a second pump that is operated by receiving supply of electric power and that suctions the hydraulic oil and supplies the hydraulic oil to a starting engagement element among the engagement elements that is engaged to start the vehicle;
 a discharge port that discharges the hydraulic oil from the first pump;
 a mounting port for the strainer that communicates with the first pump and to which the strainer is mounted;
 a first oil passage that communicates the mounting port for the strainer with the first pump;
 a second oil passage that communicates the first oil passage with the second pump; and
 a plurality of control valves that control the hydraulic pressure, and
a suction port of the second pump and the mounting port for the strainer are arranged side by side in this order in a direction orthogonal to a direction of mounting the hydraulic control device to a case member of the transmission, and also orthogonal to an axial direction of the transmission, and
the suction port of the second pump and the mounting port for the strainer are arranged on a side closer to an internal combustion engine than the control valves are in the axial direction of the transmission.

10. A power transmission device that is mounted on a vehicle, the power transmission device comprising:
 a transmission including a plurality of engagement elements for transmitting power from a motor to axles;
 a case to accommodate the transmission;
 a hydraulic control device to control hydraulic pressure to the engagement elements;
 a hydraulic oil reservoir that stores hydraulic oil;
 a first pump that is operated by the power from the motor and that suctions the hydraulic oil from the hydraulic oil reservoir through a strainer and supplies the hydraulic oil to the hydraulic control device;
 a second pump that is operated by receiving supply of electric power and that suctions the hydraulic oil and supplies the hydraulic oil to a starting engagement element among the engagement elements that is engaged to start the vehicle;
 a first oil passage that communicates an outlet port of the strainer with the first pump; and
 a second oil passage that communicates the first oil passage with the second pump, wherein
the second pump includes an electromagnetic unit and a pump unit, and is mounted on a valve body of the hydraulic control device such that the pump unit is placed between the electromagnetic unit and the outlet port of the strainer.

11. The power transmission device according to claim 10, wherein
the second oil passage does not overlap the electromagnetic unit when viewed from a vehicle up-down direction.

12. The power transmission device according to claim 11, wherein
the second oil passage is provided upright in parallel with the vehicle up-down direction.

13. The power transmission device according to claim 12, wherein the first oil passage includes a body-side oil passage that is formed in the valve body and communicates with the strainer, and also includes a case-side oil passage that is formed in the case and communicates the body-side oil passage with the first pump;
the second oil passage is formed in the valve body and communicates the case-side oil passage with the second pump; and
the second pump is mounted on the valve body at a location closer to the case-side oil passage than all valves of the hydraulic control device are.

14. The power transmission device according to claim 13, wherein
the case-side oil passage, the second oil passage, and the suction port of the second pump are arranged in this order from an upper side of the vehicle, and
the suction port of the second pump overlaps the case-side oil passage in a vehicle up-down direction when viewed from at least one of a vehicle front-rear direction and a vehicle right-left direction.

15. The power transmission device according to claim 14, wherein
the suction port of the second pump overlaps the case-side oil passage in the vehicle up-down direction when viewed from the vehicle front-rear direction, and overlaps the outlet port of the strainer when viewed from the vehicle right-left direction.

16. The power transmission device according to claim 15, wherein
the vehicle is a rear-wheel-drive vehicle;
the first oil passage communicates the strainer with the first pump on a vehicle front side of the valve body; and
the second pump is mounted on the valve body on a side closer to the vehicle front side than all valves of the hydraulic control device are.

17. The power transmission device according to claim 16, further comprising
a switching valve that establishes, when the starting engagement element is to be engaged, a first state in which the hydraulic oil discharged from the first pump and regulated in pressure is supplied to the starting engagement element when the first pump is in operation, and a second state in which the hydraulic oil discharged from the second pump is supplied to the starting engagement element when the first pump is not in operation.

18. The power transmission device according to claim 10, wherein
the first oil passage includes a body-side oil passage that is formed in the valve body and communicates with the strainer, and also includes a case-side oil passage that is formed in the case and communicates the body-side oil passage with the first pump;
the second oil passage is formed in the valve body and communicates the case-side oil passage with the second pump; and
the second pump is mounted on the valve body at a location closer to the case-side oil passage than all valves of the hydraulic control device are.

19. The power transmission device according to claim 10, wherein
the vehicle is a rear-wheel-drive vehicle;
the first oil passage communicates the strainer with the first pump on a vehicle front side of the valve body; and
the second pump is mounted on the valve body on a side closer to the vehicle front side than all valves of the hydraulic control device are.

20. The power transmission device according to claim 10, further comprising
 a switching valve that establishes, when the starting engagement element is to be engaged, a first state in which the hydraulic oil discharged from the first pump and regulated in pressure is supplied to the starting engagement element when the first pump is in operation, and a second state in which the hydraulic oil discharged from the second pump is supplied to the starting engagement element when the first pump is not in operation.

\* \* \* \* \*